Nov. 20, 1934.   H. D. CROFT   1,981,263
MACHINE TOOL
Original Filed May 23, 1930   8 Sheets-Sheet 1
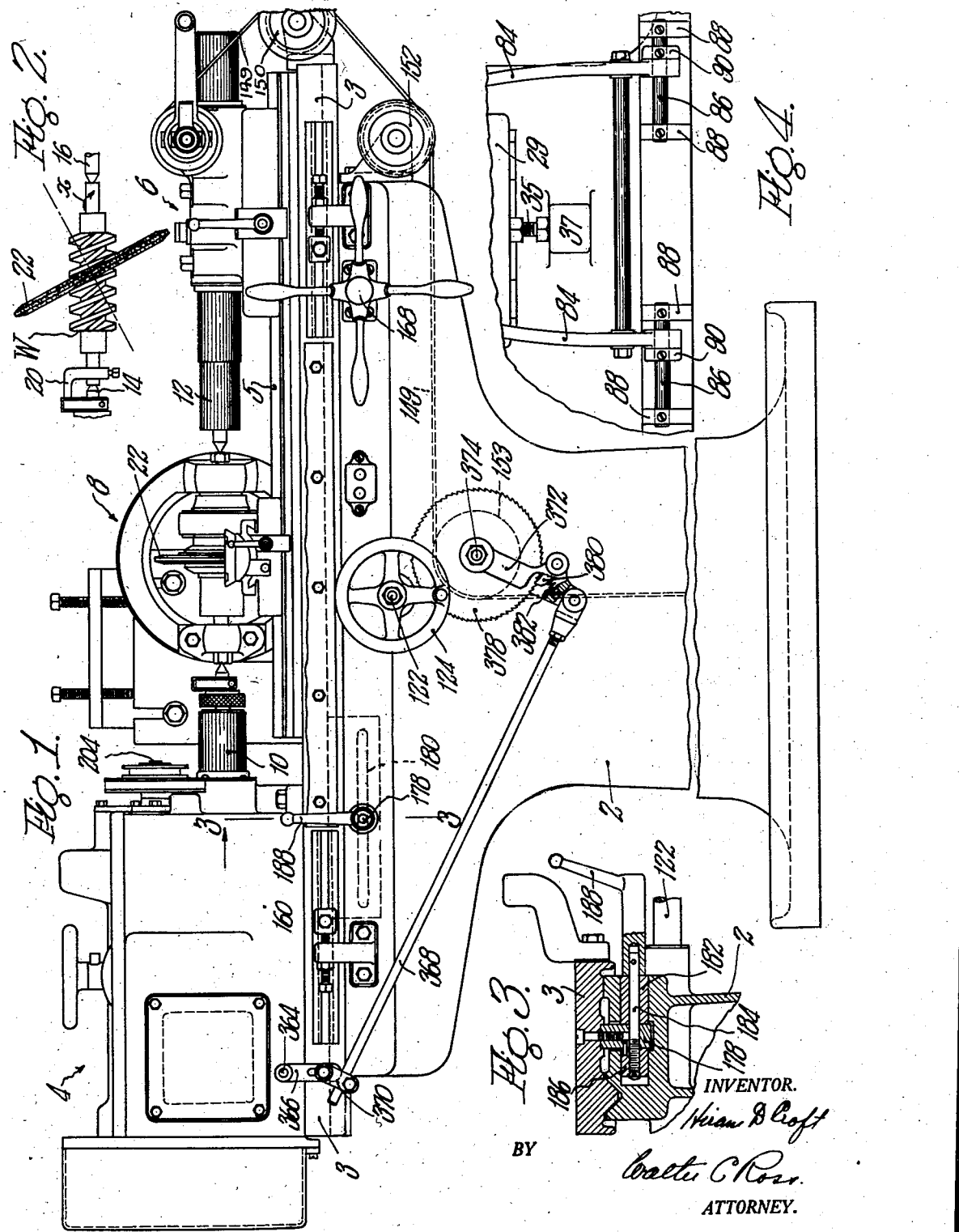
INVENTOR.
Hiram D. Croft
BY
Walter C. Ross.
ATTORNEY.

Nov. 20, 1934.  H. D. CROFT  1,981,263
MACHINE TOOL
Original Filed May 23, 1930   8 Sheets-Sheet 2
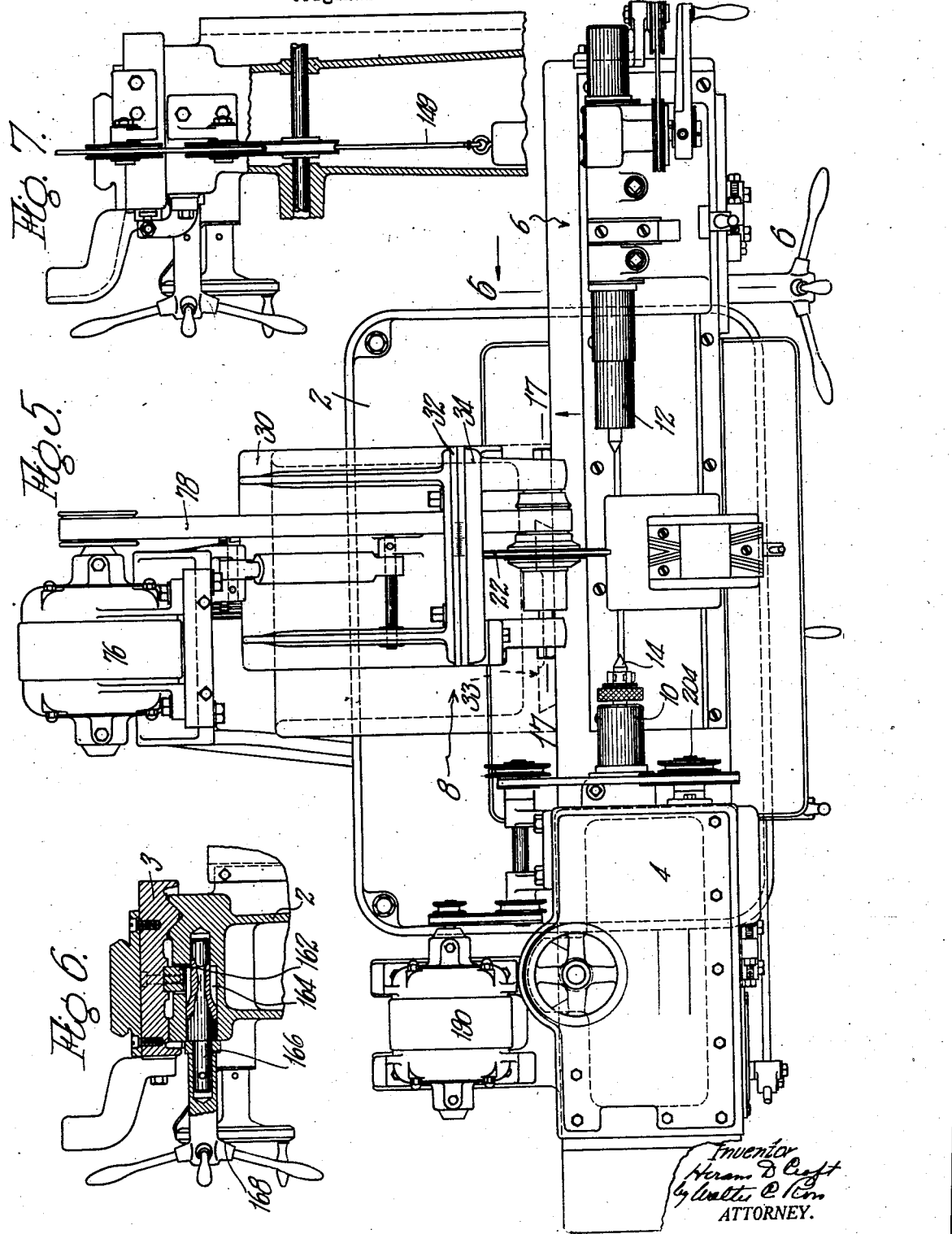

Nov. 20, 1934.  H. D. CROFT  1,981,263
MACHINE TOOL
Original Filed May 23, 1930  8 Sheets-Sheet 3
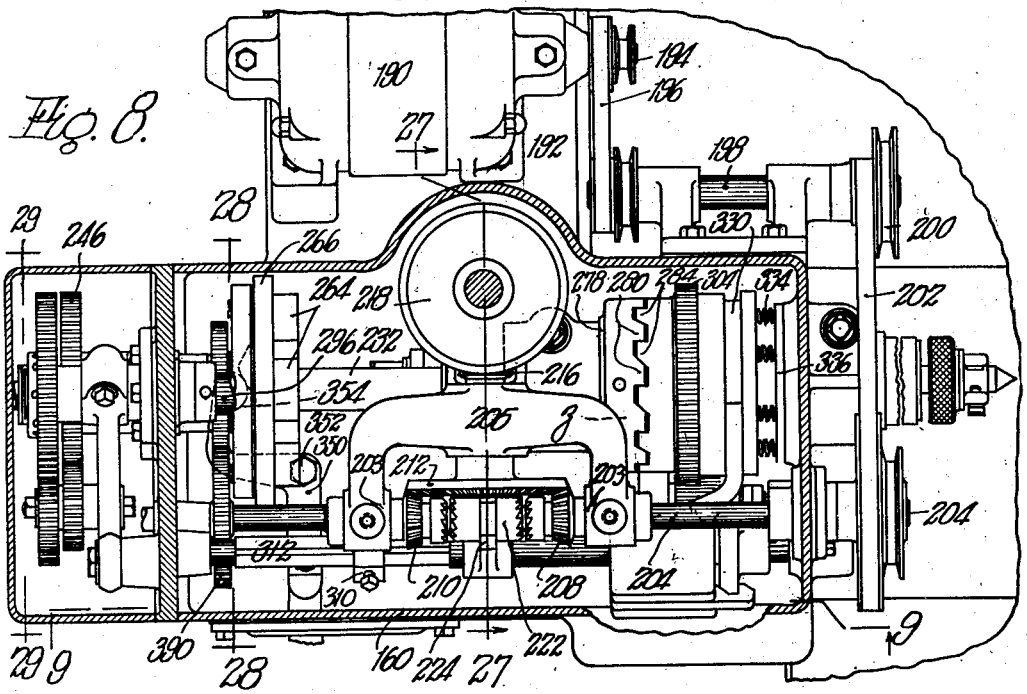
Fig. 8.
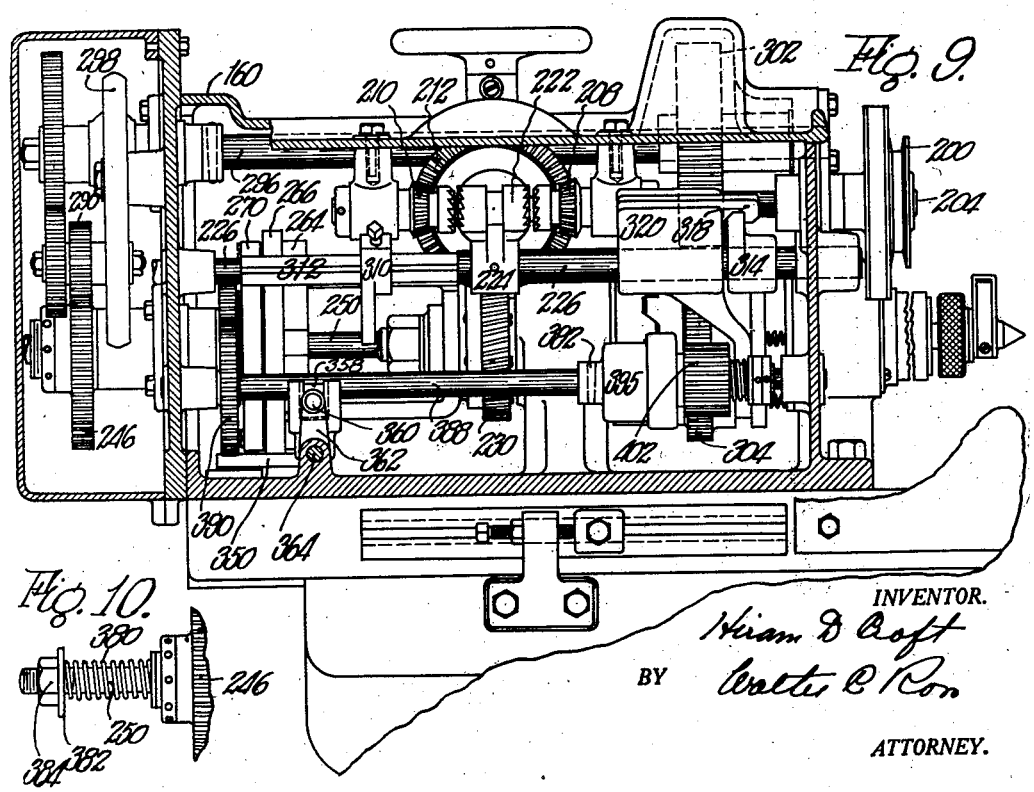
Fig. 9.
Fig. 10.
INVENTOR.
Hiram D. Croft
BY Walter C. Ron
ATTORNEY.

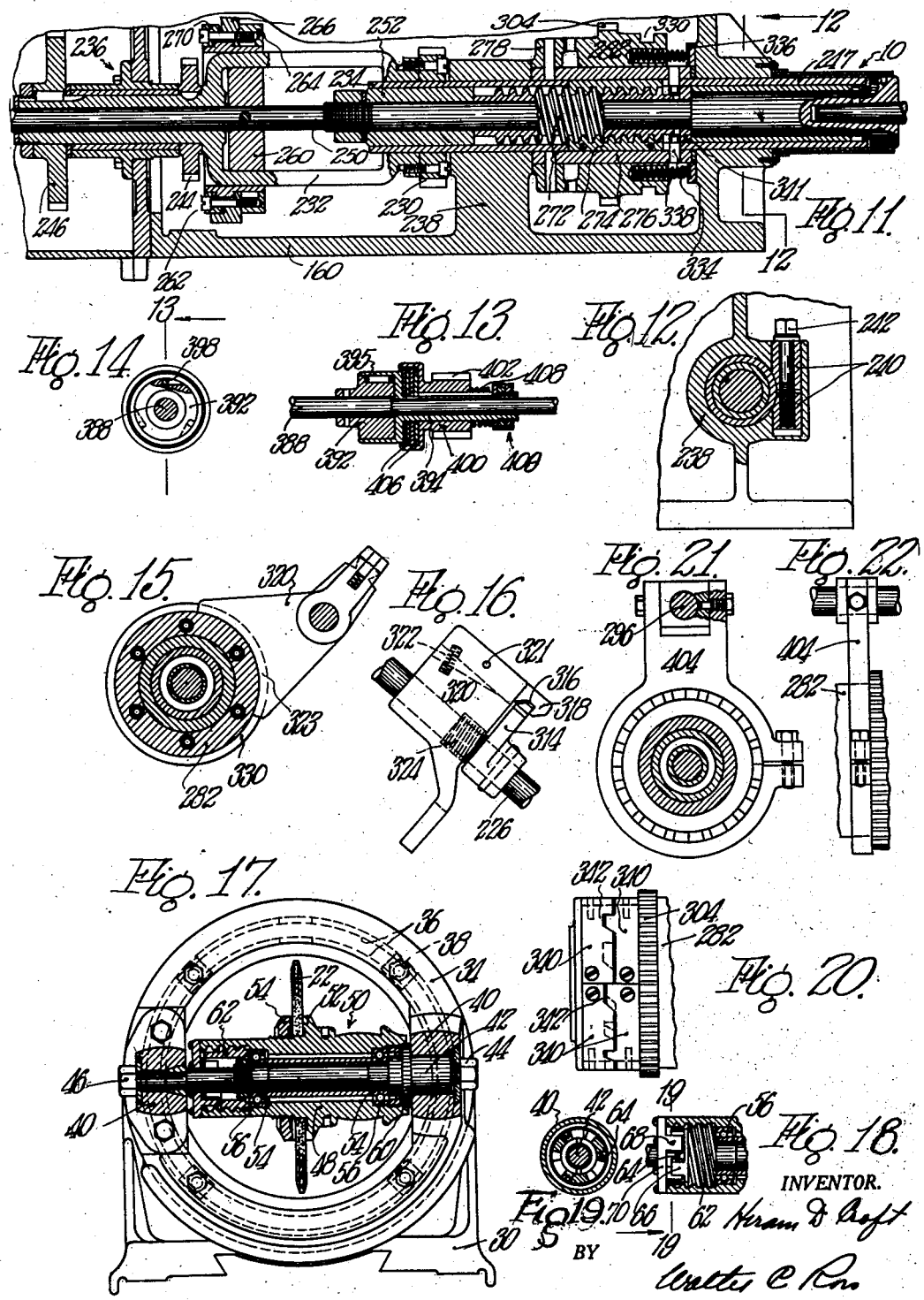

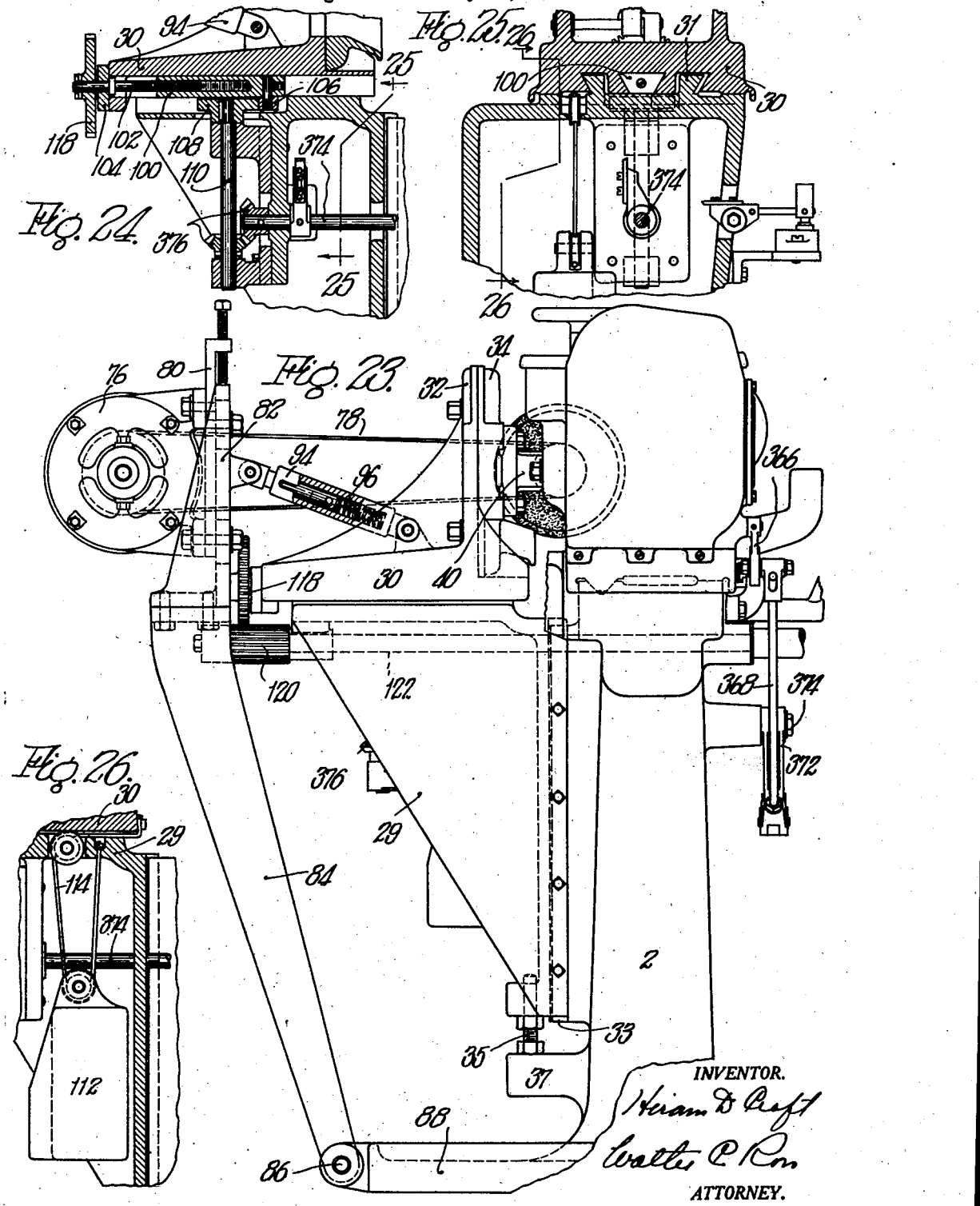

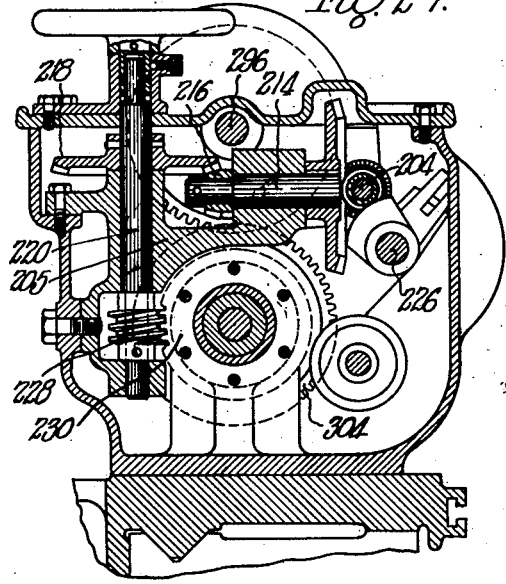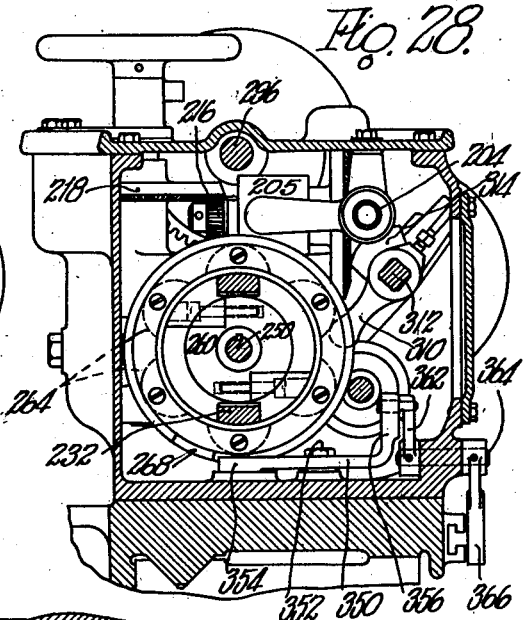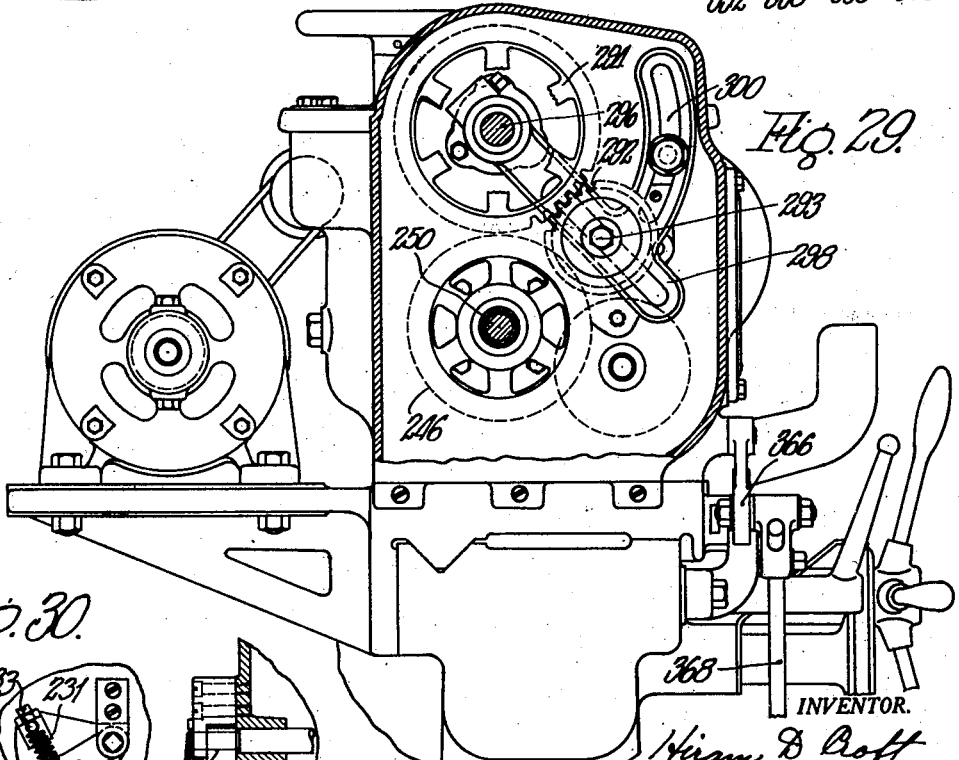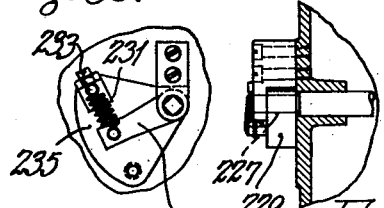

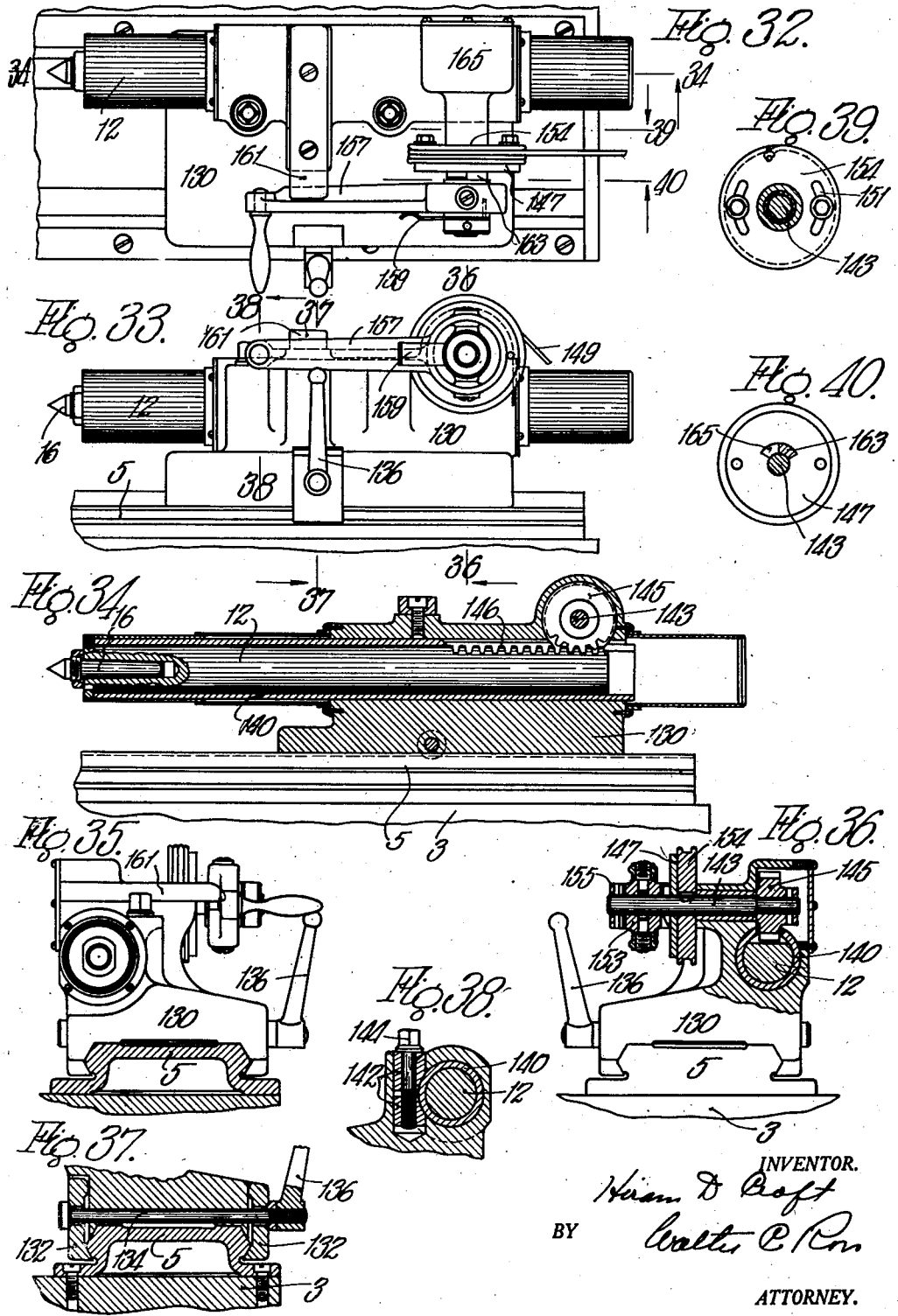

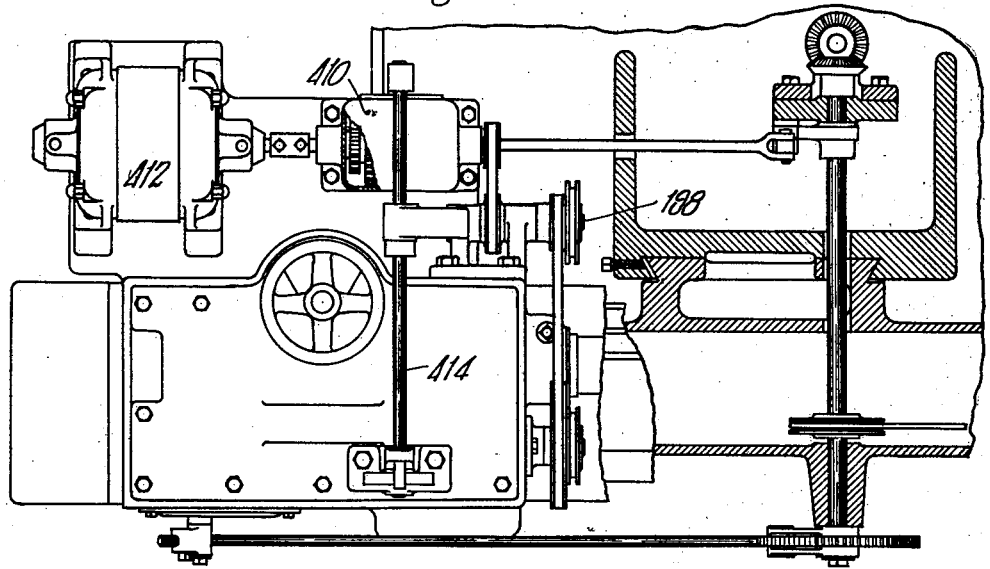
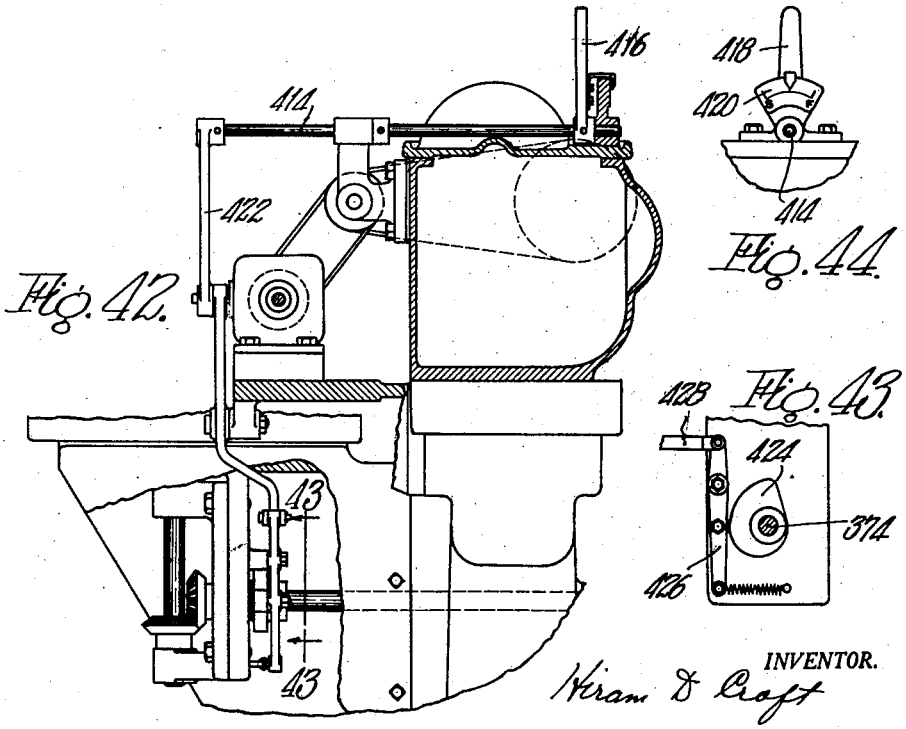
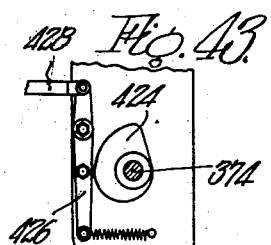

Patented Nov. 20, 1934

1,981,263

UNITED STATES PATENT OFFICE 1,981,263

MACHINE TOOL

Hiram D. Croft, Springfield, Mass., assignor to Perkins Machine & Gear Company, West Springfield, Mass., a corporation of Massachusetts Application May 23, 1930, Serial No. 454,997
Renewed April 23, 1934

13 Claims. (Cl. 51—95)

This invention relates to improvements in machine tools and is directed more particularly to machines for reciprocating and rotating a piece of work and a tool relative to one another for a machining operation.

The novel features of the invention are directed to a machine tool apparatus which is adapted to reciprocate and at the same time rotate a piece of work so that certain portions thereof contact in a certain way with a tool for a machining operation. According to the broad aspect, the machine of the invention is arranged so that a tool may act on work in such a way as to machine the work spirally.

The machine of the invention is adapted for broad application wherever it is desired that a tool operate or function in the manner specified. However in the form of the invention hereinafter to be more fully described, the apparatus is disclosed in connection with the machining of worms and the like which have one or more spirally disposed threads. It is between the threads or in the grooves, so-called, of a worm that the tool operates for a finishing or cutting operation and the worm is rotated and reciprocated relative to the work in such a way that the tool and worm move spirally of one another.

The machine of the invention embodies numerous novel features of construction and arrangement which provide numerous advantages as will be hereinafter more fully observed. The principal object of the invention is the provision of a machine which is not only efficient in its operation, for working on objects in the manner described, but which is automatic so that work may be placed in the machine and through a cycle of operation is machined with precision in the desired manner.

The various and numerous objects and advantages of the invention are pointed out in connection with the following description of the present preferred form thereof and which for purposes of disclosure is illustrated in the accompanying drawings wherein:

Fig. 1 is a front elevational view of a machine embodying the novel features of the invention.

Fig. 2 is an elevational view of a worm held between supporting collets and a tool positioned for machining the same.

Fig. 3 is a sectional elevational view taken on the line 3—3 of Fig. 1.

Fig. 4 is a fragmentary elevational view of the lower portion of the rear of the machine.

Fig. 5 is a plan view of the machine shown in Fig. 1.

Fig. 6 is a vertical sectional elevational view taken on the line 6—6 of Fig. 5.

Fig. 7 is an elevational view of the right-hand end of the machine with parts broken away and shown in section for clearness.

Fig. 8 is a sectional plan view on a line taken near the upper end of the work head housing.

Fig. 9 is a vertical sectional view taken through the head box on the line 9—9 of Fig. 8.

Fig. 10 is an elevational view of the outer end of the work spindle.

Fig. 11 is a longitudinal sectional view through the work spindle.

Fig. 12 is a vertical sectional view taken on the line 12—12 of Fig. 11.

Fig. 13 is a sectional view through certain mechanism for eliminating back lash in the work spindle driving mechanism.

Fig. 14 is an end elevational view of the same.

Fig. 15 is a transverse sectional view through the work driving spindle.

Fig. 16 is a side elevational view of a part of the work spindle operating mechanism.

Fig. 17 is a sectional view through the tool spindle take on the line 17—17 of Fig. 5.

Fig. 18 is a sectional elevational view through an end of the tool spindle.

Fig. 19 is a sectional elevational view on the line 19—19 of Fig. 18.

Fig. 20 is an elevational view of the clutch mechanism for driving the spindle nut with plates covering certain of the clutch teeth.

Figs. 21 and 22 are front and side elevational views of a modified form of parts associated with the work spindle.

Fig. 23 is an elevational view of the left-hand end of the machine.

Fig. 24 is a partial sectional elevational view through the tool slide.

Fig. 25 is a sectional elevational view taken on the line 25—25 of Fig. 24.

Fig. 26 is a sectional elevational view taken on the line 26—26 of Fig. 25.

Fig. 27 is a vertical sectional elevational view through the head box on the line 27—27 of Fig. 8.

Fig. 28 is a similar view taken on the line 28—28 of Fig. 8.

Fig. 29 is a similar view taken on the line 29—29 of Fig. 8.

Figs. 30 and 31 are side and front elevational views of certain details of construction of the work spindle driving mechanism.

Fig. 32 is a plan view of the tail-stock of the machine and Fig. 33 is a side elevational view of the same.

Fig. 34 is a longitudinal sectional view on line 34—34 of Fig. 32 through the tail stock spindle.

Fig. 35 is an end elevational view of the tail stock.

Fig. 36 is a sectional elevational view taken on the line 36—36 of Fig. 33.

Fig. 37 is a similar view on the line 37—37 of Fig. 33.

Fig. 38 is a sectional view taken on the line 38—38 of Fig. 33.

Fig. 39 is a sectional elevational view on the line 39—39 of Fig. 32 and Fig. 40 is a similar view on the line 40—40 of Fig. 32.

Fig. 41 is a plan view of the work-head end of the machine showing certain additional features of the invention.

Fig. 42 is an end elevational view of the parts shown in Fig. 41.

Fig. 43 is a sectional view taken on the line 43—43 of Fig. 42 and Fig. 44 is an elevational view of an indicating mechanism.

Referring to the drawings in detail, the invention will now be described, but in order to facilitate a clear understanding of the details of construction of the machine it will first be described in a general way with particular reference to Figs. 1 to 6 inclusive and in connection with the machining of a worm.

A bed 2 is provided on which is adjustably mounted a slide 3 which carries a work-head 4, and a tail-stock 6. A tool head 8 adjustable thereon is movable at the rear side of the bed. The work-head and tail-stock are relatively movable towards and away from one another and the tool head is movable transversely to their direction of movement.

A spindle indicated generally by 10 extends from the work-head and is moved back and forth and at the same time rotated by mechanism to be described. A spindle 12 in the tail stock is slidable but non-rotatable therein and is urged towards the spindle 10 by mechanism also to be described. Work to be machined is placed between the two spindles by which it is supported. The work head spindle engages the work for rotating it and the other spindle presses the work against the work spindle.

Collets 14 and 16 in the ends of the spindles support the work to be machined. As the spindle 12 is urged towards the other the work is held between the collets and is reciprocated back and forth by the head spindle, and rotated as mentioned.

A driving dog 20 operatively connects the work, in this case a worm W to the work-head spindle so that it is held by and rotated by the said spindle.

A tool 22 in the form of the invention shown comprises an abrasive wheel mounted for rotation on a tool carrier. The part supporting the wheel is rotatable or oscillatable so that the axis of the tool may be positioned as may be desired with respect to the axis of the work.

In the case shown the worm as stated is moved back and forth and simultaneously rotated. The tool support is adjustable so that the tool may coincide with the angularity of the threads of the worm. In this way as the worm and tool are moved relative to one another, the tool acts on a groove of the worm formed by adjacent threads thereof. When the worm has been moved forward and simultaneously rotated and then rearwardly and simultaneously rotated the work spindle is then indexed or rotated so that in a next forward and back movement the tool contacts with the sides of another pair of the threads of the worm or operates in a groove formed by adjacent threads.

In this way successive grooves or successive pairs of threads are operated on by the tool until the worm threads are machined or finished to the extent desired.

The tool slide is moved so as to feed the tool into the work to obtain various cuts by means later to be described.

Work such as worms which are to be machined spirally vary within wide limits. That is, worms may have various numbers of threads the pitch of which may vary within wide limits.

The machine is constructed and arranged so that the work spindle may be rotated and simultaneously reciprocated to move in a spiral path so as to carry the threads of a worm past the wheel in such a manner that the threads are traversed accurately by the tool. As will later appear this is accomplished by reciprocating and rotating the spindle in definite predetermined relation.

The tool-head mechanism will first be described in detail with particular reference to Figs. 1, 5, 17, 23, 24, 25 and 26.

A tool slide 30 is movable transversely of the axis of the work spindle at the upper side of a slide 29 adjustable vertically at the rear side of the machine bed 2. The tool slide is movable transversely for varying its position relative to the work in a horizontal plane, while the vertical adjustment of the slide 29 is for varying the elevation of the tool with respect to the axis of the work spindle and work.

These slides are suitably guided by ways 31 and 33 as shown. The tool slide is moved by mechanism later to be described, while the slide 29 may be elevated by an adjusting bolt 35 threaded in the lower end thereof and which abuts a portion 37 of the bed. The tool slide 30 at its upper side has an upwardly extending flange or plate 32 on which is rotatably adjustable a tool carrier 34. The carrier is held in various positions of angular adjustment by clamp bolts 38 in the plate 32 which have their inner ends in an annular slot 36 as shown in Fig. 17.

Bearings 40 extending forwardly of the carrier 34 support a non-rotatable shaft 42, see Fig. 17. This shaft extends through the bearings and is held in place by nuts 44 and 46 threaded on opposite ends thereof.

A tool hub 48 is rotatable on said shaft and carries a pulley 50, while an abrasive wheel 22 is clamped against a flange 52 of the hub by means of a clamp member 54 in the threaded engagement with said hub. Inner races 54 of ball bearings are carried by the shaft 42, while outer races 56 support the hub 48. In this way the hub turns freely on the shaft. The right hand end of the hub is arranged to bear against a suitable collar 60 of the shaft 42.

The left-hand end of the hub is interiorly threaded and has therein a threaded thrust collar 62. This abuts the outer raceway 56 of the left-hand ball bearing. It is yieldingly held thereagainst by springs 64 disposed between lugs 66 and 68 carried by the collar 62 and by an end plate 70 fixed to the end of the hub. The springs tend to rotate the collar and screw it into the hub at all times. This is desirable as slight elongation of the parts caused by heat are compensated for and the whole structure is free of end play and binding action so that the wheel 22 will rotate as is desirable. Since the member 34 may be rotated to various positions of adjustment the wheel may be set at various predetermined angular positions relative to the axis of the work spindle. For instance, in a position such as in Fig. 2.

The tool shaft is driven by means of a motor 76 and belt 78. The motor is fixed to a vertically disposed slide plate 80 which is slidably adjustable on a bracket 82 (see Fig. 23) by means of suitable bolt and slot construction (as shown).

Downwardly depending arms 84 secured to the bracket 82 are oscillable and longitudinally adjustable along rods 86 fixed in lugs 88 which extend rearwardly of the bed 2.

Collars 90 held in various positions of adjustment along the rods 86 hold the arms 84 in various positions of longitudinal adjustment on said rods 86.

A plunger rod 92 pivoted to bracket 82 has its end slidable in a tube 94 pivoted to the tool slide 30 and a spring 96 interposed therebetween tends to separate the parts and functions thereby to swing the bracket 82 rearwardly. This action keeps the belt 78 taut at all times which is desirable.

An auxiliary slide 100 between the tool slide 30 and upper side of slide 29 is movable with respect to both of them. A feed screw 102 having its end in threaded engagement with said slide 100 is rotatable in a plate 104 fixed to the rear side of said tool slide 30.

The auxiliary slide has a depending roller 106 which rides upon a cam 108 fixed to a vertical shaft 110. The said slide is urged rearwardly, so that the roller bears on the cam, by a weight 112 suspended on a cable 114 which has one end fixed to the tool slide 30 and its other end fixed to slide 29.

The slides 30 and 100 are relatively slidable for purposes of adjusting the tool relative to the work. The slide 30 is actuated by the slide 100 so as to feed the tool relative to the work in a predetermined manner.

The shaft 110 is rotated to feed the auxiliary slide and tool slide forwardly and back by means later to be described, while the screw 102 as stated is rotated to change or adjust the relative position of said slides by means now to be described.

A gear 118 on the end of the screw 102 is in engagement with a pinion 120 of a transverse shaft 122, which has a hand wheel 124 at the forward side thereof. By turning the hand wheel in one direction or the other the slide 30 is moved relative to said slide 100 and the tool is moved towards or away from the work. This is a manual operation and facilitates the setting of the tool relative to the work, while feeding movements are accomplished by rotation of the cam 108.

The tail stock 6 will now be described in detail with reference to Figs. 32 to 40 inclusive. A tailstock body 130 is guided for sliding movements along the upper side of a slide 5 on member 3 slidable on bed 2. The tail-stock is at the right hand end thereof and is held in various positions of adjustment by means of clamp members 132 at either side of the body which are moved into clamping engagement by a clamp bolt 134 having a clamp handle 136 fixed thereto.

A tubular member 140 is held in a bore of the body by clamp members 142 in a vertical bore which are actuated by a clamp bolt 144. The tail-stock spindle 12 is reciprocable in tube 140 and has the collet or center in the forward end thereof.

A transverse shaft 143 is rotatable in the body and has a pinion gear 145 meshing with teeth on the end of the spindle 12. By rotating the shaft and gear counter clockwise the spindle is moved rearwardly.

The spindle is normally urged towards the work spindle by a weight 141 which is carried at the lower end of a cable 149 passing over idlers 150, 152 and 153, the upper end of the cable being fixed to a drum 154 secured to shaft 143. As the work spindle moves forward and back the work is urged thereagainst at all times by the spindle 12 which is actuated by the cable and weight.

When it is desired to move the spindle to separate it from the work head spindle and remove a piece of work from between the spindles the following is provided.

A plate 147 loose on shaft 143 is adjustably clamped by bolt and slot construction 151 to drum 154. A hub 153 is rotatable on shaft 143 between a collar 155 fixed to the shaft and plate 147. A lever 157 is pivoted for swinging on said collar and is urged inwardly by a spring 159 so that it will underlie a stop 161 extending forwardly of the body. A lug 163 at the rear end of the lever hub is adapted for abutting a side of a lug 165 projecting from plate 147.

With this arrangement the lever 157 may be swung outwardly from beneath stop 161 so as to be free for rotation. As it is rotated counterclockwise the lugs 163 and 165 are brought into abutment so that the plate and drum are rotated to take up the cable while the spindle is moved to the right or away from the work spindle.

The work head mechanism will now be described in detail with reference to Figs. 1, 2, 3, 5, 8, 9, 10, 11 to 16 inclusive and 20 to 29, inclusive.

The work head mechanism is supported by and contained in a housing or casing 160 which is carried on the slide 3 described as being slidable along the upper side of the bed, suitable ways being provided therefor. A rack 162 depending from the slide 3 meshes with a pinion 164 of a transverse shaft 166 and an operating wheel 168 provided at the outer end of said shaft may be utilized for rotating the shaft and moving the slide 3 along the bed.

A plate 178 depending from the slide 3 is provided with an elongated slot 180 and a cylindrical plug 182 confined in an opening in the bed is bored to rotatably receive a clamp bolt 184. This bolt passes through the slot in the plate and its outer end is threaded in a second plug 186. The plugs are at either side of the plate 178 so that by rotating the screw the plugs tighten against the plate and since the plug 182 is confined by the bed the plate and consequently the slide 3 is locked against movement. In this way the slide and head may be securely fixed in any desired position of adjustment. An operating lever 188 at the end of bolt 184 is provided to facilitate the turning thereof.

A motor 190 fixed on supports 192 at the rear side of the work head housing is operatively connected by pulleys 194 and a belt 196 to a short shaft 198 journalled at the rear side of the head. This shaft is operatively connected by pulleys 200 and belt 202 to a drive shaft 204 rotatable in the upper part of the housing 160 and in spaced bearing 203 of a bracket 205 fixed in the housing.

Gears 208 and 210 (see Figs. 8 and 9) rotatable on said drive shaft 204 mesh with a driven gear 212 fixed to a transverse shaft 214 journalled in bracket 205. A pinion 216 fixed to the rear end thereof meshes with a gear 218 fixed on a vertical shaft 220 rotatable in bracket 205. A clutch 222 slidable but non-rotatable on shaft 204 has clutch teeth at its opposite ends for engaging with clutch teeth at the inner ends of gears 208 and 210, all as shown. A shifting fork 224 fixed to a shaft 226 slidable in the housing engages the clutch for moving it in one direction or the other. As one set or the other of the clutch teeth are engaged one of the gears 208 or 210 is thereby held against turning on the shaft and drives gear 212 in one direction or the other. The shifter is operated for driving the mechanism in opposite directions.

A worm 228 fixed to the lower end of a vertical shaft 220 meshes with a gear 230. This gear (see Fig. 11) is secured to a yoke member 232. The yoke is rotatable on a tube 234 and in a bearing construction 236 at the outer end of housing. The tube 234 is held in a bearing 238 of the housing by means of clamp blocks 240 and a clamp screw 242 after the manner shown in Fig. 12. Gears 244 and 246 are fixed to the yoke 232. The former is for driving certain antiback lash mechanism and the latter for driving mechanism for reciprocating the work spindle. A central work spindle shaft 250 is journalled at its rear end in the yoke, intermediate its ends in a bushing 252 in tube 234 and at its forward end in a tube 247 held in housing, all as shown.

A split hub 260 of a mechanism for actuating a reversing mechanism and indexing mechanism and indicated generally by 262, is fixed to spindle 250 by a pin as shown. The said hub slidably embraces the yoke 232 so that the spindle may be rotated by the yoke while at the same time the shaft may move longitudinally of the yoke which is not slidable.

A plurality of cams 264 are secured to one face of a flange 266 of the hub and a knock off cam 268 is secured to the other face of said flange or may be made a part thereof. Preferably the cams and flange are held in place on the hub by means of a clamp ring 270 so that various members of cams may be employed and which may be adjusted angularly relative to one another.

A driving worm 272 is fixed to or made a part of shaft 250 and meshes with a nut 274 fixed to a barrel 276. One end of said barrel is rotatable on tube 234 and its other end on tube 247. It has fixed thereon a clutch plate member 278 provided with clutch teeth 280 at its forward face. A clutch hub 282 is rotatable and slidable on said barrel 276 and has teeth 284 for engaging with the teeth of the plate. With the hub clutched to the plate the plate barrel and nut are either rotated or held by the hub according as the hub is either rotated or held against rotation.

As has been described the spindle is rotated through gear 230 and yoke in one direction or the other.

Relative rotative movements of the nut and worm of the work spindle brings about reciprocating movements of the spindle. It is desired to describe at this point the operation of the spindle worm, nut, barrel, flange and hub.

Assume that the worm 272 has a single thread of one inch pitch. In this case if the nut is held against rotation the spindle will be reciprocated one inch for each of its revolutions. If the nut is rotated in the same direction as and at the same speed as the spindle there will be no reciprocating movement of the spindle.

If it is desired to rotate and reciprocate the spindle spirally at the rate of a two-inch pitch, the nut would be rotated in a direction reverse to that of and at the same speed as that of the spindle.

Therefore by providing a worm 272 and nut 274 of a certain number of threads and pitch as well as direction of spiral and by moving the nut in a certain direction and at a certain speed with respect to that of the spindle it is possible to reciprocate the spindle a certain distance per revolution of the spindle and obtain a spiral movement of certain form. By changing the relative speeds and direction of movement of the parts it is possible of course to obtain any desired spiral movement of the spindle.

In reality the hub 282 is rotated by mechanism driven from the gear 246 which rotates with the spindle. A gear 290 meshing with gear 246 and rotatable with a gear 292 which meshes with a gear 294 of shaft 296 operatively connects the shafts so that the upper shaft is driven by the work spindle shaft. The gears 290 and 292 are rotatable on a stud 293 adjustable along a lever 298 oscillatable on shaft 296 which may be held in various positions of adjustment by means of a slot and bolt construction 300 as shown in Fig. 29. In this way various combinations of gears may be substituted for gears 290 and 292 and thereby the relative speeds of shafts 250 and 296 are varied. A gear 302 on shaft 296 is in meshing engagement with a gear 304 integral with hub 282 whereby the hub is rotated with or relative to the shaft 205.

To feed the worm forwardly as in Fig. 2 the spindle 250 is driven in the direction shown and at the same time it is fed forwardly in the direction of the arrow shown. This is accomplished as follows:

The clutch teeth at the left of clutch member 222 is engaged with pinion 210 so that gear 212 is driven in direction of the arrow thereon. The shaft 214 rotates in the direction shown and through gears 216 and 218 rotates shaft 220 in the direction indicated. The worm 228 through gear 230 rotates shaft 250 in the direction of arrow $x$. The hub 282 for driving the nut is rotated in the manner already described.

The work spindle thus being fed forwardly and simultaneously rotated carries the worm so that the wheel or tool acts spirally therein. After the wheel traverses the work, the spindle is then rotated and reciprocated reversely to move the worm rearwardly at the same rotative and longitudinal speeds whereby the tool may traverse the same part of the worm in an opposite direction. When the work spindle has moved rearwardly it is indexed by a rotative movement so that another pair of threads or a groove is positioned to engage with the tool in a subsequent forward and back spiral movement.

The spindle 250 is reversed in its direction of rotative and longitudinal movements by disengaging clutch 222 from gear 210 and engaging it with gear 208. Obviously this will cause rotation of the various shafts and gears in a direction opposite to what has been described.

The clutch is moved by the means now to be described.

A reversing arm 310 adjustable along a squared portion 312 of shafts 226 is engageable by one of the cams 264 of the flange 266 as it reaches the end of its forward stroke and as it rotates and is swung outwardly or counter clockwise by the rotating cam so as to rock shaft 226. A dog 314 fixed to said shaft 226 at the right hand end thereof is swung by the shaft so that it passes radially out of a notch 316 of a latch 318 pivoted at 321 to a forked bracket 320. The latch is urged downwardly by a spring 322, interposed between it and the bracket, so that its notched end bears against the forward end of the bracket. A spring 324 disposed between bracket 320 and dog 314 forces the dog and consequently the shaft to which it is fixed forwardly or to the right, as the dog swings out of the notch so that the shifter 224 moves the clutch 222 to the right, disengaging from gear 210 and engaging gear 208.

The parts, that is the cams 264 and member 310 are so arranged and adjusted that the shifting of the clutch takes place when the spindle has reached the desired limit of its forward movement and by operation thereof the parts are operated to then move the work spindle inwardly or rearwardly again.

The bracket 320 is loose on the shaft 226 and has a depending end 323 which rides in an annular groove 330 of hub 282.

The shaft 226 is urged counter-clockwise to swing the arm inwardly by means of the following with reference to Figs. 30 and 31. An extension 227 of shaft 226 located outside the housing has a lever 229 fixed thereto and a spring 231 connected to said lever and to a stud 233 of a plate 235 exerts a pulling action as the shaft is rotated and returns it. The plate is removably secured to the housing and may be reversed if it is desired to urge the shaft in an opposite direction.

When the work spindle has advanced and retracted as explained the spindle is indexed or oscillated so that another pair of threads or a groove of the worm is positioned angularly so as to be contacted with the tool. This is accomplished by the following means.

Springs 334 are interposed between the end of hub 282 and a plate 336 bearing on the inner right-hand side of the housing and yieldingly hold the teeth 280 and 284 of hub 282 and member 278 in operative engagement, see Fig. 8. Pins 338 in sleeve 276 and extending radially thereof are disposed so that they may be engaged in notches in a flange 341 fixed to the spindle (see Fig. 11). Of course other engageable means may be employed.

As the spindle reaches the limit of its rearward movement the pins and slots are engaged so that the barrel, nut and flange are rotated by and with the spindle in the direction of dotted arrow z (see Fig. 8). By this rotative movement the inclined faces of teeth 280 of flange 278 act on the teeth 284 of hub 282 and force the hub to the right against springs 334. The hub is urged towards the flange as stated and when the teeth and slots are rotated into registration the springs cause the hub to move into engagement again with the flange. In this way the nut is rotated by the spindle and the angular position of the shaft and nut is changed relative to the hub and indexed for a subsequent forward feeding movement wherein the tool will act on the worm between another pair of threads.

As the hub is moved forwardly by the so-called cam action of the clutch teeth the bracket 320 is carried forwardly thereby on shaft 226 so that the latch 318 rides up and over dog 314. As the hub returns to clutching relation with member 278 it moves the bracket 320 which now has latched to it the dog 314 and carries shaft 226 to the left thus disengaging clutch 222 from gear 208 and engages said clutch with gear 210.

Thus as the hub and flange are separated from engagement the spindle is being indexed. When the hub and clutch are re-engaged the clutch 222 is shifted to connect the parts for operating in opposite directions for a forward movement of the spindle in its new position.

There may be any desired number of teeth in the members 278 and 282, but as shown there are twelve by reason of which the work spindle may be indexed in twelve angular positions. This of course would be desirable where the worm being machined has twelve threads, but where there are a less number it is necessary for proper indexing that the teeth of the hub 282 skip some of the teeth in the member 278.

To accomplish this a plurality of plates 340 are provided which may be removably secured to the hub and member 278. These may have various numbers of teeth or slots 342 spaced therearound so that as the hub 282 rotates the teeth thereof will pass over one or more slots of the member 278. The plates 340 shown have six slots so that thereby the spindle may be indexed for six different angular positions.

A set of plates of the type shown may be provided for indexing the spindles for worms having any number of threads.

Thus a worm is fed forward and spirally relative to the tool and returned in an opposite spiral, then the work spindle is indexed for another forward and return spiral movement.

The tool is fed towards the axis of the work spindle by the following means:

A lever 350 is pivoted to the housing at 352 for swinging movements in a horizontal plane and has a rear end 354 disposed so that it will be engaged by cam 268. It has an upwardly extending forward end 356 which is provided with a vertical slot as shown.

A block 358 in said slot receives a pin 360 of a lever 362 which is fixed at one end of a shaft 364 journalled in the housing. A lever 366 fixed at the outer end of shaft 364 has a rod 368 adjustably pivoted thereto by means of strap 370 all as shown. The lower end of the rod is pivoted to a lever 372 oscillatable on a shaft 374 rotatable transversely in the bed. A pair of gears 376 are fixed to said shaft 374 and shaft 110 (see Fig. 24).

A ratchet wheel 378 is fixed to shaft 374 and a pawl 380 pivoted in lever 372 is yieldingly urged into engagement with the teeth of said ratchet by means of a spring 382.

As the lever 352 is actuated by cam 268 the lever 362 and shaft 364 are rocked so that by means of the link connected to levers 366 and 372 the pawl 380 rides over and engages with the teeth of the ratchet. By varying the adjustment of the connections between rod 368 and lever 366 the throw of lever 372 may be varied and more or less the angular feeding steps of the shaft 374 may be varied. The movement of the shaft 374 through gears 376 causes a rotation of shaft 110 so that cam 108 is rotated. This cam against which the tool slide 30 and auxiliary 100 bear moves the slides forward and back to feed the tool towards and away from the work spindle.

The cam 108 may be formed so that the tool slide after what may be called a roughing cut is fed a less distance to facilitate the tool taking a less or a finishing cut.

It requires one complete revolution of the work spindle for the cam 268 to engage the lever 352 so that for the successive feeding movements of the spindle throughout one revolution the tool slide is not necessarily moved. After the spindle has been indexed step by step throughout one revolution the slide feeding mechanism may operate.

In order to eliminate back-lash or lost motion of the parts and thereby insure efficient operation and accurate work, the following is provided.

First (see Fig. 10) any endwise movement in the spindle 250 is obviated by a spring 380 on the end thereof which is disposed between a washer 382 and a side of the housing. A nut 384 in threaded engagement with the spindle may vary the tension of the spring so that the spindle is urged to the left whereby the threads of screw 272 are urged against those of the nut. As the spindle moves to the right the movement is against the action of the spring and is at all times subject to the action of the spring.

A shaft 388 is journalled in the housing and is operatively connected by a gear 390 fixed at one end which meshes with gear 244 fixed to yoke 232. An inner hub member 392 is fixed to shaft 388 and an inner clutch member 394 is rotatable and slidable on said shaft and has an annular rim 395 loosely embracing the hub. Tangentially disposed notches 396 in the hub have rollers 398 movable therein. An outer clutch member 400 rotatable on member 394 has a gear 402 meshing with gear 304. A plurality of interlacing clutch discs 406 are disposed between the members 392 and 394 and a spring 408 between the member 394 and suitable nut and washer construction 409 at the end of the latter member urge the members together, so that they are frictionally engaged by the discs.

These parts operate in the following manner: As spindle 250 rotates in a clockwise direction and clutch hub 282 in a similar direction the yoke fixed to the spindle is connected through gears 244 and 390 to shaft 388 so that the shaft is driven in an opposite direction by said first-named spindle. The outer clutch member 400 is geared to the hub member 282. To obtain the spiral movement of the spindle referred to the hub is rotating at a faster speed than the spindle so that inner clutch member 394 is driven in the direction of shaft 388 and the rim 395 rotates around member 392, the clutch rolls do not come into play.

When the direction of movement of the spindle is reversed with the hub 282 also reversed and operating at a faster speed than the spindle the action of the mechanism is as follows: The outer clutch member 400 is rotated clockwise as is shaft 388 and at a faster speed than said shaft. The inner clutch member driven by the outer member through the discs is clutched to member 392 by the rollers so that the clutch members 394 and 400 move relative to one another, the discs allowing of this. In this way the friction of the discs amounts to a load on the parts and thereby back-lash is obviated.

In case it is desired to operate the machine to accommodate a worm of certain type it may be accomplished as follows: The work spindle worm would be designed to produce the proper reciprocating movement of the spindle with reference to its rotative movement. The hub would be held against rotation by a bracket 404 clamped thereto (see Figs. 21 and 22) which is slidable on shaft 296. With this arrangement the spindle would rotate and reciprocate in certain directions and then rotate and reciprocate in opposite directions.

When the spindle reaches the end of its rearward movement the flange 278 would be operated in the manner described for indexing the spindle.

In this way it is possible to eliminate the mechanism for driving the hub, barrel, nut, etc.

A modified form of certain features of the invention will be described in connection with Figs. 41 to 44, inclusive.

In this form the work-head shaft 198 is driven from one end of a change speed gear mechanism 410 having its other end operatively connected to a motor 412. A shaft 414 journalled on top of the housing has an operating handle 416 and a pointer 418 for indexing with a dial 420. A lever 422 at the rear end of the shaft is adapted as the shaft is oscillated to shift the gears in the box and vary the speed at which shaft 198 is driven. This is accomplished automatically by means of a cam 424 on cross shaft 374, which cam acts on a lever 426 which in turn is connected by a link 428 having its upper end attached to the speed changing element of said gear box. By means of this apparatus the speed of the shaft 198 and consequently the work spindle may be varied so that the work is driven at variable speed relative to the tool.

I am aware that various changes may be made in the form of the invention shown without departing from the spirit and scope thereof. Therefore I do not wish to be limited by the exact form shown and described, but rather, if at all, by the appended claims.

What I claim is:

1. A machine of the class described comprising in combination, a reciprocable and rotatable spindle, a worm thereon, a rotatable nut on said worm, a hub and plate for rotating said nut including shiftable clutching means for connecting the plate and hub in various angular positions, means on said spindle for shifting said means, mechanism for driving said spindle including reversing means, and operable by said spindle for operating the same, means for feeding a tool towards and away from said spindle and means operable by said spindle for actuating the same.

2. A machine of the class described comprising in combination, a spindle reciprocable and rotating in opposite directions, a worm thereon, a nut on said worm, mechanism to operate said spindle including reversing means, driving mechanism operating on said nut to effect reciprocation of said spindle which is driven by the last named mechanism including an angularly shiftable clutch to clutch said spindle and mechanism in various angular positions.

3. A machine of the class described comprising in combination, a spindle reciprocable and rotating in opposite directions, a worm thereon, a nut on said worm, mechanism to operate said spindle including reversing means, driving mechanism operating on said nut to effect reciprocation of said spindle which is driven by the last named mechanism including an angularly shiftable clutch to clutch said spindle and mechanism in various angular positions, mechanism operable by reciprocating movements of the said spindle to actuate said reversing means.

4. A machine of the class described comprising in combination, a spindle reciprocable and rotating in opposite directions, a worm thereon, a nut on said worm, mechanism to operate said spindle including reversing means, driving mechanism operating on said nut to effect reciprocation of said spindle which is driven by the last named mechanism including an angularly shiftable clutch to clutch said spindle and mechanism in various angular positions, mechanism operable by reciprocating movements of the said spindle to actuate said reversing means and mechanism associated with said shaft and nut to shift said clutch.

5. A machine of the class described comprising in combination, a spindle reciprocable and rotating in opposite directions, a worm thereon, a nut on said worm, mechanism to operate said spindle including reversing means, driving mechanism operating on said nut to effect reciprocation of said spindle which is driven by the last named mechanism including an angularly shiftable clutch to clutch said spindle and mechanism in various angular positions, mechanism operable by reciprocating movements of the spindle in opposite directions to actuate said reversing means, and means associated with said spindle and nut and operable by a reciprocating movement of said spindle in one direction to shift said clutch.

6. A machine of the class described comprising in combination, a spindle reciprocable and rotatable in opposite directions, a worm thereon, a nut on said worm associated with a plate having clutch teeth, a hub movable relative to said plate and nut having clutch teeth for engaging those of the plate, means for urging the clutch teeth into engagement, means for rotating said plate relative to the hub for disengaging said clutch teeth and for indexing said spindle relative to said hub.

7. In a machine tool, a bed, a spindle rotatable and angularly adjustable therein, a bracket movable on said bed in a certain plane, a second bracket adjustable on said first-named bracket in a plane opposed to said certain plane, a driving shaft on said last-named bracket, driving connections between said shaft and spindle and means to urge the brackets in a direction away from said spindle.

8. In a machine tool the combination of, a support, a shaft non-rotatable thereon, a rotatable hub having a bearing on said shaft, a thrust member at one end of said hub against which the hub may bear, yielding means associated with the other end of said hub and said bearing for urging said hub against said thrust member.

9. In a machine tool the combination of, a support, a shaft non-rotatable thereon, a rotatable hub having a bearing on said shaft, a thrust member at one end of said hub against which the hub may bear, yielding means associated with the other end of said hub and said bearing for urging said hub against said thrust member, the said means including a member movable relative to said hub and bearing on said bearing and a spring interposed between said member and said hub.

10. In a machine tool the combination of, a support, a shaft non-rotatable thereon, a hub having a bearing on said shaft, a thrust member at one end of said hub against which the hub may bear, a member movable relative to said hub for bearing on said bearing axially of said shaft and yielding means between said member and hub.

11. In a machine tool the combination of, a support, a shaft non-rotatable thereon, a rotatable hub having a bearing on said shaft, a thrust member at one end of said hub, the opposite end of said hub being interiorly screw threaded and a screw member therein, a spring outside said member between it and said hub to yieldingly urge the member towards said bearing.

12. In a machine tool the combination of, a support, a shaft non-rotatable thereon, a rotatable hub having a bearing on said shaft, a thrust member at one end of said hub, the opposite end of said hub being interiorly screw-threaded and a screw member therein, a spring interposed between said member and a part of said hub and disposed to operate circumferentially of said shaft to urge said member against said bearing.

13. In a machine tool the combination of, a support, a shaft non-rotatable thereon, a rotatable hub and a bearing between said shaft and hub, a thrust member at one end of said hub, the other end of said hub being interiorly screw threaded, a screw member therein, springs between said member and a part of said hub disposed to operate circumferentially of said shaft to turn said member relative to said hub into yielding engagement with said bearing.

HIRAM D. CROFT.